(No Model.)
E. B. GATES.
CLAMP EAR FOR TROLLEY WIRES.
No. 509,616. Patented Nov. 28, 1893.
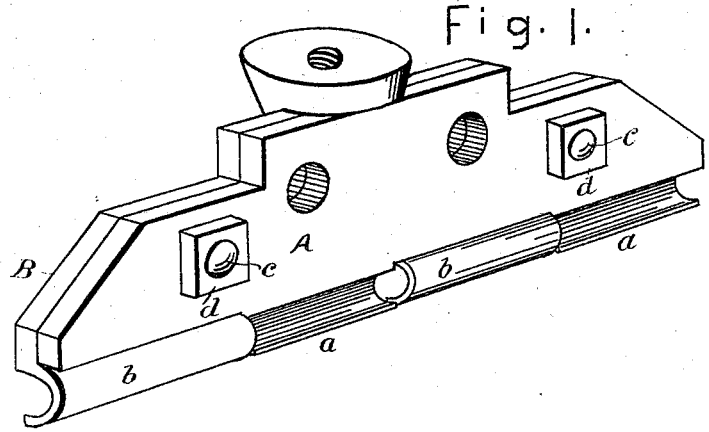
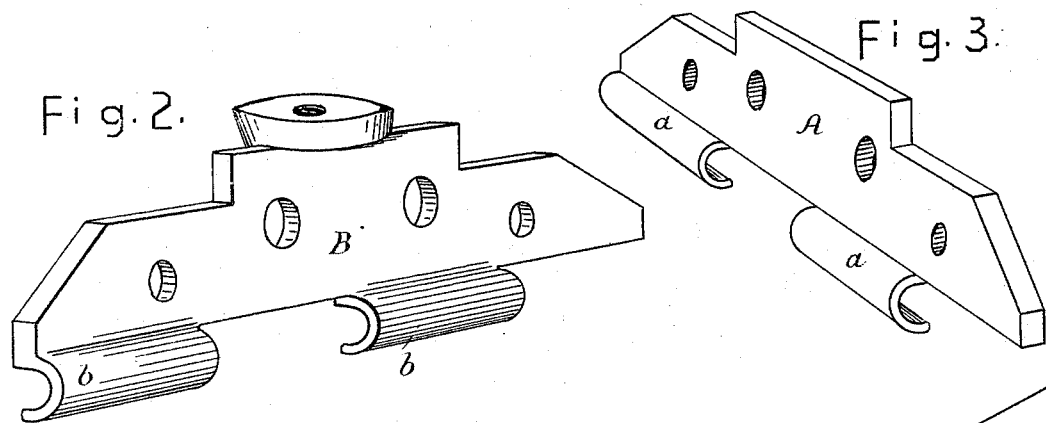
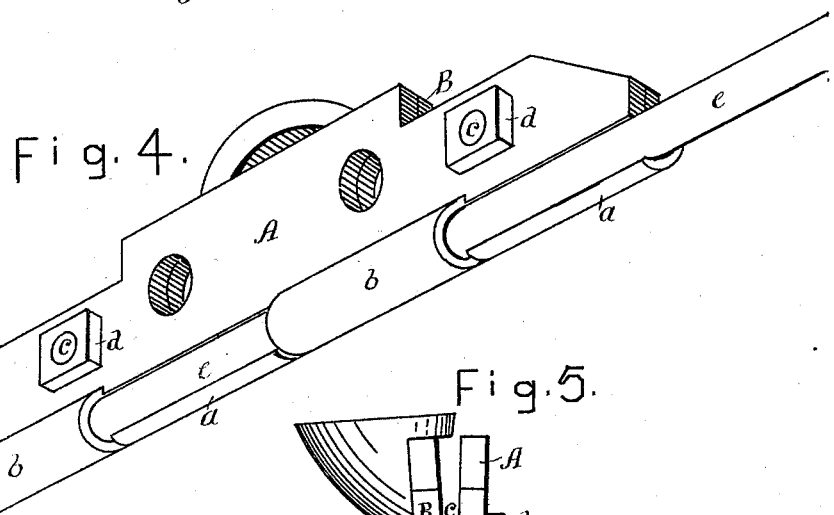
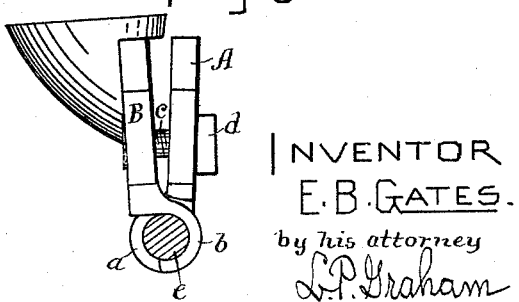
ATTEST
Helen Graham
William Graham
INVENTOR
E. B. GATES.
by his attorney
L. P. Graham
THE NATIONAL LITHOGRAPHING COMPANY,
WASHINGTON, D. C.

UNITED STATES PATENT OFFICE.

EDWIN B. GATES, OF DECATUR, ILLINOIS, ASSIGNOR OF ONE-HALF TO DON CARLOS SHAW, OF SAME PLACE.

CLAMP-EAR FOR TROLLEY-WIRES.

SPECIFICATION forming part of Letters Patent No. 509,616, dated November 28, 1893.

Application filed April 5, 1893. Serial No. 469,101. (No model.)

*To all whom it may concern:*

Be it known that I, EDWIN B. GATES, of Decatur, in the county of Macon and State of Illinois, have invented certain new and useful Improvements in Clamp-Ears for Trolley-Wires, of which the following is a specification.

This invention is designed to provide means for connecting hangers, switches, &c., with the trolley wires of electric cars, and for other analogous uses, and it consists in a pair of plates having each jaws and intermediate spaces, the jaws of one plate being adapted to the spaces of the other, and bolts and nuts, or their equivalent, to draw the plates together and clamp the jaws onto the wire.

In the drawings forming part of this specification Figure 1 is a perspective representation of the ear detached from the wire. Figs. 2 and 3 represent the two plates separate from the wire and from each other. Fig. 4 shows the ear attached to a wire, and Fig. 5 is an end view showing the condition of the ear when it is placed in position on the wire and before it is clamped by tightening the nuts of the bolts.

Plate A has clamp jaws $a$ and intermediate spaces. Plate B has clamp jaws $b$ and intermediate spaces, and the jaws of one plate act in the spaces between the jaws of the other plate. The plates are placed in position with the jaws embracing the wire $e$, and are carried to the position shown in Fig. 5, or thereabout, when the size of the wire, relative to the capacity of the jaws, will tend to arrest further progress. The nuts $d$ are then tightened on bolts $c$, which extend through both plates, and as the plates are drawn together each acts on the other after the manner of a lever of the first class and each jaw tends to force the wire into the space of the opposite plate, thereby slightly kinking or bending the wire in opposite directions and precluding longitudinal motion of the ear on the wire.

The particular ear shown is adapted for use as a hanger to be used in curves, but, so far as this invention is concerned, it makes no difference for what purpose the ear is used or what construction it has, apart from the peculiarities specified.

Having thus described my invention, I claim as new and desire to secure by Letters Patent—

An ear for trolley wires consisting of two plates each having clamping jaws and intermediate spaces, (the plates being adapted to act each on the other after the manner of a lever of the first class, and the jaws of each plate being adapted to act in the spaces of the other plate with a shearing tendency) and bolts and nuts to draw the plates together and thereby utilize their lever action in clamping the jaws onto the trolley wire.

In testimony whereof I sign my name in the presence of two subscribing witnesses.

EDWIN B. GATES.

Witnesses:
FRANK R. SHULL,
HARDIN C. WALLACE.